United States Patent
Vollmer et al.

(10) Patent No.: US 7,158,869 B2
(45) Date of Patent: Jan. 2, 2007

(54) METHOD, DEVICE AND BUS MANAGER FOR OPERATING A DEVICE THAT IS CONNECTED TO A MOTOR VEHICLE COMMUNICATIONS NETWORK

(75) Inventors: Vasco Vollmer, Gartow (DE); Matthias Hofmann, Hildesheim (DE); Wolfgang Baierl, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 10/070,115

(22) PCT Filed: Jun. 16, 2001

(86) PCT No.: PCT/DE01/02241

§ 371 (c)(1),
(2), (4) Date: Nov. 11, 2002

(87) PCT Pub. No.: WO02/03618

PCT Pub. Date: Jan. 10, 2002

(65) Prior Publication Data

US 2003/0120396 A1    Jun. 26, 2003

(30) Foreign Application Priority Data

Jun. 30, 2000    (DE) ............................... 100 31 891

(51) Int. Cl.
*G06F 7/00* (2006.01)
(52) U.S. Cl. ............... 701/36; 701/33; 340/825.71
(58) Field of Classification Search ............ 701/1, 701/33, 36; 340/825.57, 825.71; 398/111
See application file for complete search history.

(56) References Cited

U.S. PATENT DOCUMENTS

| | | | | |
|---|---|---|---|---|
| 4,023,075 A | * | 5/1977 | Reuter | 361/76 |
| 4,114,730 A | * | 9/1978 | Means et al. | 187/247 |
| 4,459,591 A | * | 7/1984 | Haubner et al. | 340/825.57 |
| 5,993,623 A | * | 11/1999 | O'Neill et al. | 204/424 |
| 6,028,537 A | * | 2/2000 | Suman et al. | 340/988 |
| 6,672,151 B1 | * | 1/2004 | Schultz et al. | 73/146.5 |

FOREIGN PATENT DOCUMENTS

| | | |
|---|---|---|
| DE | 42 26 704 | 2/1994 |
| DE | 198 53 451 | 5/2000 |
| EP | 0 444 997 | 9/1991 |
| EP | 0 798 626 | 10/1997 |
| EP | 0 863 639 | 9/1998 |
| EP | 0 870 648 | 10/1998 |

* cited by examiner

Primary Examiner—Gertrude A. Jeanglaude
(74) Attorney, Agent, or Firm—Kenyon & Kenyon LLP

(57) ABSTRACT

A method of operating a device which is connected to a vehicle communications network is described, a switched-off device being reactivated by the bus manager via a frequency pulse transmitted over a power supply line. The device may be switched off by the bus manager or by itself if there is no data communication with the device for a predetermined period of time. The frequency pulse is analyzed by an analyzer circuit of the switched-off device, the analyzer circuit having a frequency-selective filter and a threshold detector. The frequency pulse may be transmitted at a frequency which is valid for only one device or at a frequency for a group of devices or at a frequency for all devices. If the devices are arranged in branches, then all the devices downstream from a switched-off device are also switched off or reactivated.

10 Claims, 2 Drawing Sheets

METHOD, DEVICE AND BUS MANAGER FOR OPERATING A DEVICE THAT IS CONNECTED TO A MOTOR VEHICLE COMMUNICATIONS NETWORK

BACKGROUND INFORMATION

The IEEE 1394 bus system is already known; it is a serial bus system which is self-configuring and is currently being expanded for operation as a vehicle communications network. Power saving modes have already been described in IEEE 1394a, where a device connected to such a serial bus system has four different activity states ranging from full activity to a complete shutdown. If a device is switched off completely, it must nevertheless have a basic functionality at the level of the bit transmission layer (physical layer) to be able to analyze the wake-up command in particular.

SUMMARY OF THE INVENTION

The method according to the present invention for operating a device connected to a vehicle communications network has the advantage over the related art that more efficient energy management is achieved because the functionality of the bit transmission layer is largely switched off except for the necessary means for analyzing the frequency pulse for waking up the switched-off device again.

In addition, it is advantageous that the frequency pulse is transmitted over the power supply line, because then the activation call for the switched-off device does not put any load on the data bus, and the means for analyzing the frequency pulse are connectable directly to the power supply line, which has proven to be extremely advantageous.

Furthermore, it is advantageous that the method according to the present invention permits a differentiation between a shutdown state, a state of basic functionality, achieved by activation via the frequency pulse, and a state of full functionality, achieved through another command from the bus manager, for example. This differentiation permits greater energy savings in an advantageous manner, because the switched-off device has switched off the functionality for analyzing commands except for the frequency pulse. The frequency pulse puts the device in a state for receiving and analyzing a wake-up command, preferably over the data bus.

It is especially advantageous that the frequency pulse is implemented by a simple analyzer circuit composed of a frequency-selective filter for frequency selection and a threshold detector for power selection; therefore, false signals do not have any effect.

In addition, it is advantageous that a selective switched off of the devices is achieved through the frequency pulse if the frequency of the frequency pulse is different for individual devices or groups of devices, so that only those devices to be activated or switched off are capable of analyzing the frequency pulse.

As an alternative, if no frequency-selective switched off or reactivation of the device is possible, it is advantageous that an entire branch of the vehicle communications network is switched off, in which case the device to be switched off would then also cause all the devices downstream from this device to be switched off. This is an especially simple method of performing a shutdown.

It is also advantageous that shutdown and/or reactivation are performed by the bus manager, so that this function is carried out centrally. This simplifies the method according to the present invention.

In addition, it is also advantageous that a device will shut itself down when it detects that there has not been any data communication for a predefined period of time. This relieves the bus manager of such a monitoring function in an advantageous manner.

DETAILED DESCRIPTION

Use of vehicle communications networks in motor vehicles is increasing due to the increased number of multimedia functions (car radio, navigation, car PC, Internet access through the car). When various devices are connected to the vehicle communications network, some devices not being used as certain times, it becomes necessary to use an intelligent energy management concept to optimize power consumption by the devices.

Therefore, according to the present invention a method of operating a device connected to a vehicle communications network is implemented in such a way that once the device is switched off, it is reactivated again by a frequency pulse from a bus manager over a power supply line. An analysis is possible by a simple analyzer circuit connected to the power supply line, and only this analyzer circuit need be operated, i.e., supplied with power, while the device is switched off. It is therefore possible to switch off the functionalities of the bit transmission layer which includes data transmission as a functionality. The analyzer circuit is implemented by a frequency-selective filter and a downstream threshold detector. Shutdown may be accomplished either through the bus manager, again using a frequency pulse sent over the power supply line, or through the device itself. The latter type of shutdown occurs when no data traffic has been transmitted or received over the vehicle communications network for a certain period of time. If the frequency of the frequency pulse is varied and a frequency that is differentiable using the frequency-selective filter is assigned to the respective device or group of devices, then frequency-selective shutdown or reactivation of devices is possible. As an alternative, it is possible by shutting down a device to also cause devices in a branch downstream from this device to be switched off.

A bandpass filter is used as the frequency-selective filter here. However, it is also possible to implement frequency-selective filtering on a digital basis. Then a digital signal processor, for example, will be used.

In communications models such as the well-known OSI model, functions are divided into layers. The lowest layer assumes functions such as modulation, filtering and amplification, i.e., functions based on the hardware. This layer is referred to here, as in the OSI model, as the bit transmission layer. The layers above the bit transmission layer assume software-based functions such as formatting the data to be transmitted. The top layer is usually an application layer, i.e., providing functions for a user, such as the operable functions of a CD player.

Figure 1:
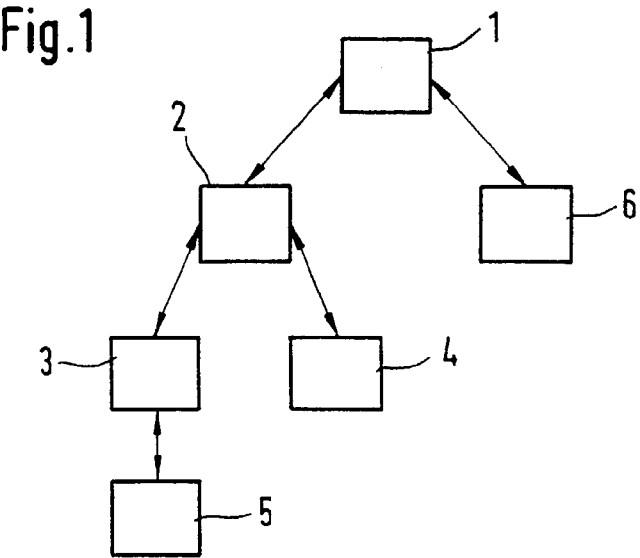
FIG. 1 shows the topology of a branched network.

FIG. 1 illustrates the topology of a branched network. A bus manager 1 is connected to a relay node 2 over a first data input/output. Bus manager 1 is connected to a mobile telephone 6 over a second data input/output. In this network topology, bus manager 1 is the root because bus manager 1 is the top node in the graph. A CD player 3 is connected to a second data input/output of relay node 2. A car radio 4 is connected to a third data input/output of relay node 2. CD player 3 is connected to a CD changer 5 at its second data input/output. As an alternative, it is also possible for this network topology to be supplemented by additional devices. It is also possible for the vehicle communications network to be made up of fewer devices than shown here. Furthermore, it is also possible for the network to be more complex and have multiple relay nodes and optionally for the individual relay nodes to also have functionalities. Relay node 2 here is a loudspeaker system having an audio amplifier. The power supply line runs parallel to the data inputs/outputs between the individual devices. The data lines here are electric lines, but optical lines are also possible as an alternative. In this case, the connected devices have means such as optical couplers for sending and receiving optical signals.

If bus manager 1 shuts down CD player 3 via a frequency pulse capable of being analyzed only by the analyzer circuit of CD player 3, then CD player 3 will switch off its functionality itself except for the analyzer circuit. Bus manager 1 is able to reactivate CD player 3 using another frequency pulse. In the same manner, bus manager 1 is able to turn all the other devices on and off in a frequency-selective operation. In addition, it is also possible for bus manager 1 to switch off entire groups of devices if these groups of devices are capable of analyzing such a frequency pulse in the same manner. As an alternative, it is possible for bus manager 1 to switch off relay node 2 and thus also the downstream devices, namely CD player 3, car radio 4 and CD changer 5. Bus manager 1 makes this shutdown if no data communication has been transmitted from the respective device over the vehicle communications network for a predefined period of time. This predefined period of time may be one minute, for example. In addition, it is also possible for this shutdown to take place through relay node 2, so that as an alternative CD player 3 may be switch off together with CD changer 5 or car radio 4. It is also possible for the individual devices to switched off after the predetermined period of time, thereby relieving a higher-level instance such as bus manager 1 of this monitoring function. Then the frequency pulse relayed over the power supply line is used only to reawaken the device. In addition, it is also possible for the shutdown command to be sent over the data lines from bus manager 1 to the individual devices because the devices themselves are not yet switched off here.

However, activation or wake-up is possible only with the frequency pulse, because the switched-off devices have switched off their means for analyzing data sent over data lines.

Figure 2:
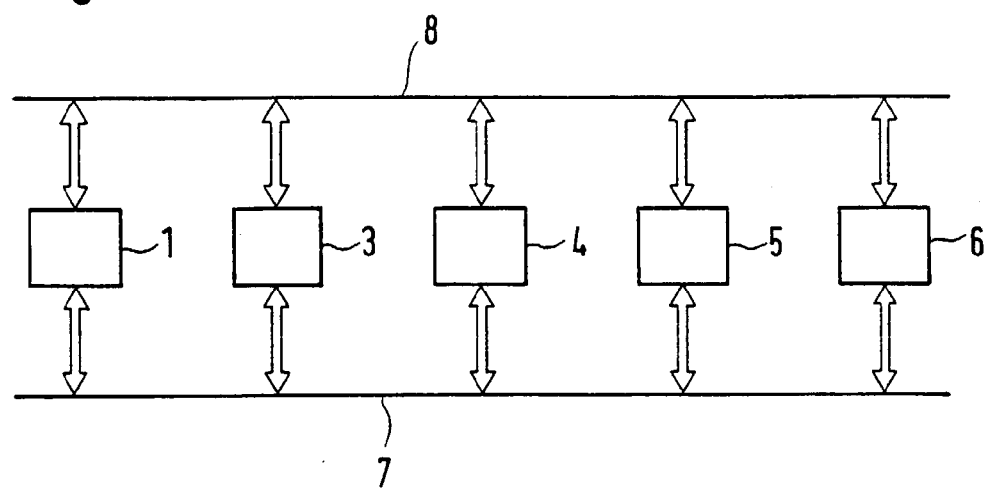
FIG. 2 shows a bus system.

FIG. 2 shows a bus system in which the devices are networked over a data bus 7. In addition to a data bus 7, the devices are also linked together over a power supply line 8. Bus manager 1, CD player 3, car radio 4 and CD changer 5 are each connected to data bus 7 and power supply line 8. Data inputs/outputs are used for communication over data bus 7, the individual devices having bus controllers to accomplish the data communication over data bus 7, and an input from power supply line 8 to receive power and optionally to receive and analyze the frequency pulse.

Furthermore, bus manager 1 also has an output to power supply line 8 to deliver the frequency pulse to power supply line 8. If other devices should also be able to send the frequency pulse, then these devices must also have an output to power supply line 8.

In this bus system, it is either possible for all devices to be switched off by a frequency pulse sent by bus manager 1 if the analyzer circuits of devices 3, 4, 5 and 6 are all tuned to the same frequency, or for each device to have its own frequency for the frequency pulse so that individual shutdown or reactivation is possible, or for the devices to be combined in groups, each group being assigned a frequency pulse at a certain frequency for shutdown or reactivation of this group.

Figure 3:
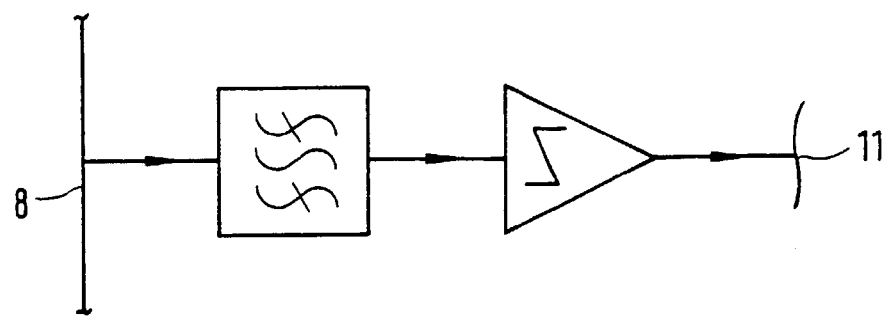
FIG. 3 shows an analyzer circuit.

FIG. 3 shows the analyzer circuit as a block diagram. Power supply line 8 on which the frequency pulse is transmitted has a branch as an output to a frequency-selective filter 9. Frequency-selective filter 9 is set at a certain midrange frequency which is the same for all devices, different for all devices or different for groups of devices, as explained above. The signal passing through frequency-selective filter 9 then goes to a threshold detector 10 which compares the power of the signal with a predetermined threshold. Weak and/or noisy signals are thus blocked out as faulty signals, and only signals having a power level above the threshold cause the device to be reactivated. The output signal of the threshold decision circuit is zero when the power is below the predetermined threshold or it has a predetermined voltage level when the power is above the threshold. In this case, the device is reactivated or switched off, with the frequency pulse being intended mainly for reactivation because the shutdown may also readily take place over data lines. In reactivation, the functions of the bit transmission layer are activated first, so that a wake-up command over the data lines may be analyzed to then provide full functionality of the device. As an alternative, it is also possible to reestablish the full functionality of the device immediately on reactivation.

Figure 4:
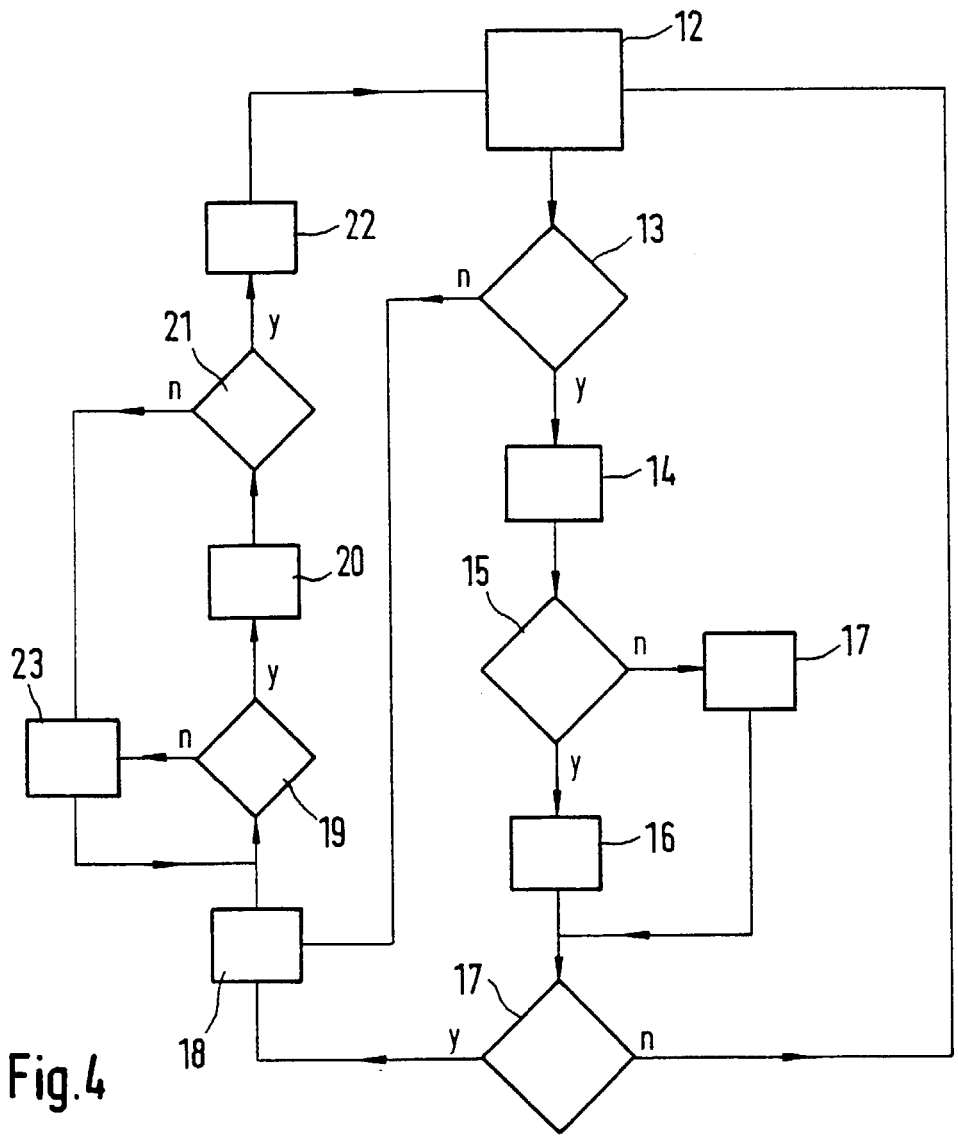
FIG. 4 shows a flow chart of the method according to the present invention.

FIG. 4 shows a flow chart of the method according to the present invention. Method step 12 analyzes the fact that the device has not had any data communication over the vehicle communications network for a predetermined period of time. Then in method step 13 a check determines whether the bus manager should perform the shutdown. If this is the case, then in method step 14 the frequency pulse is transmitted over power supply line 8. In method step 14 a determination is made as to whether the frequency pulse is selective, i.e., valid for a single device or for a group of devices. If this is the case, then in method step 16 only the specific device will analyze the frequency pulse via threshold detector 10 because only frequency-selective filter 9 of this device allows the frequency pulse to pass through to threshold detector 10, but with other devices the frequency pulse is damped so much by frequency-selective filter 9 that threshold detector 10 delivers an output signal of zero.

If it is found in method step 15 that the frequency pulse is not selective, then each device analyzes whether the frequency pulse exceeds the threshold indicated by threshold detector 10. Then a check in method step 17 determines whether the frequency pulse is above the threshold; if this is the case, the device is switched off in method step 18. The device is also switched off if it is found in method step 13 that bus manager itself should not perform the shutdown but instead the device should shut itself down. As an alternative, shutdown of devices may also be performed by commands sent over the data lines or by the devices themselves if there has not been any data traffic from the respective device for a predetermined period of time.

In method step 19 a check by bus manager 1 determines whether data is to be transmitted to the switched-off device or whether data is to be requested from the switched-off device. If this is the case, then in method step 20, bus manager 1 transmits a frequency pulse to the device, and in method step 21 the device again performs an analysis via frequency-selective filter 9 and threshold detector 10. If an output signal greater than zero has been delivered by threshold detector 10, then in method step 22 the device is turned on again, then there is a return to method step 12, waiting to see whether the device will deliver any data communication for a predetermined period of time. As explained above, activation may lead to full functionality of the device either immediately or in increments.

If it is found in method step 21 that the signal is below the threshold, then the system waits in method step 23 and returns to method step 19 to wait for signaling by a frequency pulse from bus manager 1. The system also jumps from method step 19 to method step 23 to wait when it is found in method step 19 that bus manager 1 does not wish any new data traffic with the switched-off device. If the frequency pulse is not found to be below the threshold in method step 17, the device is not switched off and the system returns to method step 12 to wait and see whether the device will perform any data communication for a predetermined period of time.

What is claimed is:

1. A method of operating a device which is connected to a vehicle communications network, the method comprising:
   detecting, using a bus manager that is connected to the device via the vehicle communications network, that data communication with the device in a switched-off state is necessary, the device in the switched-off state lacking the capacity to receive data sent over a data line; and
   subsequently reactivating the switched-off device by the bus manager via a frequency pulse transmitted over a power supply line.

2. The method according to claim 1, further comprising:
   switching off all functionality of a bit transmission layer of the device, except a functionality enabling the device to respond to the frequency pulse.

3. A method of operating a device which is connected to a vehicle communications network, the method comprising:
   detecting, using a bus manager, that data communication with the device in a switched-off state is necessary;
   subsequently reactivating the switched-off device by the bus manager via a frequency pulse transmitted over a power supply line;
   comparing the frequency pulse with a threshold value by an analyzer circuit of the switched-off device; and
   reactivating the switched-off device when a signal power of the frequency pulse exceeds the threshold.

4. The method according to claim 3, further comprising:
   switching-off the device by a frequency pulse; and
   transmitting the frequency pulse at a frequency which is detected by at least one analyzer circuit of a device of the vehicle communications network.

5. The method according to claim 3, further comprising:
   switching-off all devices downstream from the switched-off device in a branch of the vehicle communications network; and
   reactivating devices downstream from the reactivated device.

6. The method according to claim 3, further comprising:
   switching-off and reactivating the device by the bus manager.

7. The method according to claim 3, further comprising:
   reactivating the device, which shut itself down, by the bus manager.

8. A device comprising:
   an arrangement for connecting to a communications network;
   an analyzer circuit connected to a power supply line, the analyzer circuit including a frequency-selective filter and a threshold detector, wherein:
   the analyzer circuit is configured to reactivate the device when a frequency pulse transmitted over the power supply line is present, and
   the device in a switched-off state lacks the capacity to receive data sent over a data line.

9. A bus manager comprising:
   means for detecting that data communication with a device in a switched-off state is necessary, the device being connected to the bus manager via a vehicle communications network, the device in the switched-off state lacking the capacity to receive data sent over a data line; and
   means for subsequently reactivating the switched-off device via a frequency pulse transmitted over a power supply line.

10. The bus manager according to claim 9, further comprising:
    an arrangement for switching off all functionality of a bit transmission layer of the device, except a functionality enabling the device to respond to the frequency pulse.

* * * * *